United States Patent [19]

Mehta

[11] 3,857,714

[45] Dec. 31, 1974

[54] HIGH CALCIUM SULFATE EXPANSIVE CLINKER

[75] Inventor: Povindar K. Mehta, El Cerrito, Calif.

[73] Assignee: Chemically Prestressed Concrete Corporation, Van Nuys, Calif.

[22] Filed: Feb. 4, 1974

[21] Appl. No.: 439,529

Related U.S. Application Data

[63] Continuation-in-part of Ser. No. 171,299, Aug. 22, 1971, abandoned.

[52] U.S. Cl................... 106/89, 106/100, 106/102, 106/104, 106/314
[51] Int. Cl.............................................. C04b 7/02
[58] Field of Search............. 106/89, 100, 102, 104, 106/314, 315

[56] References Cited
UNITED STATES PATENTS

| 3,155,526 | 11/1964 | Klein | 106/104 |
| 3,251,701 | 5/1966 | Klein | 106/104 |
| 3,303,037 | 2/1967 | Klein | 106/104 |
| 3,510,326 | 5/1970 | Miki | 106/89 |

*Primary Examiner*—J. Poer
*Attorney, Agent, or Firm*—Edward B. Gregg

[57] ABSTRACT

Expansive calcium sulfoaluminate clinker containing a high proportion of calcium sulfate is prepared and is included in portland cement (e.g., by intergrinding calcium sulfoaluminate clinker with portland cement clinker) to contribute expansive properties to concrete made from the cement, and to contribute false set resistance to the cement by incorporating the calcium sulfate required as anhydrite present in the expansive clinker.

8 Claims, No Drawings

HIGH CALCIUM SULFATE EXPANSIVE CLINKER

This application is a continuation-in-part of copending application, Ser. No. 171,299, entitled "High Calcium Sulfate Expansive Clinker," filed Aug. 22, 1971, now abandoned.

This invention relates to portland cement.

Certain terminology employed in the portland cement industry will be used herein, such (and the equivalent chemical names and formulas) being as follows:

| Chemical Formula | Chemical Name | Portland Cement Terminology |
|---|---|---|
| $(CaO)_3SiO_2$ | Tricalcium silicate | $C_3S$ |
| $(CaO)_2SiO_2$ | Dicalcium silicate | $C_2S$ |
| $(CaO)_3Al_2O_3$ | Tricalcium Aluminate | $C_3A$ |
| $CaSO_4$ | Calcium sulfate | $CS$ |
| $CaO$ | Calcium Oxide (lime) | $C$ |
| $H_2O$ | Water | $H$ |
| $Fe_2O_3$ | Ferric oxide | $F$ |

Portland cement consists mainly of calcium silicate, principally tricalcium silicate ($C_3S$) with smaller amounts of the dicalcium silicate ($C_2S$) and is made by burning a mixture of limestone and an argillaceus material.

Due to the presence of alumina in the raw materials, especially the argillaceous component (which is typically shale or clay), a certain amount, typically about 5 to 13 percent, of tricalcium aluminate ($C_3A$) is present in portland cement. This $C_3A$, if present in substantial amount, causes excessively rapid setting of freshly made concrete (a mixture of portland cement, mineral aggregate and water) or mortar (a mixture of portland cement, sand and water). Under normal condition, and especially where the concrete or mortar is prepared at a central mixing plant and is transported some distance to a construction site, it is essential that the mortar or concrete not set sooner than about one hour and in any event that it remain readily pourable until it is placed in a form or cavity.

To counteract the tendency (which is roughly proportional to $C_3A$ content) of portland cement to undergo quick setting, it is current and widespread practice to include calcium sulfate in the cement. Typically this is done by intergrinding portland cement clinker as it comes from the kiln in which it is made, with gypsum. However, the clinker may be hot at the time of intergrinding and/or heat is generated during intergrinding. This residual and/or mechanically generated heat tends to partially dehydrate the gypsum, thus, to produce plaster of Paris:

1. $CaSO_4 \cdot 2H_2O = CaSO_4 \cdot \frac{1}{2} H_2O + 1\frac{1}{2} H_2O$

Plaster of Paris is very soluble; it dissolves quickly in water added to form concrete or mortar and the water often becomes saturated with respect to the calcium sulfate hydrate. As a result, needle-like crystals of the calcium sulfate hydrate form which stiffen the mix and produce what is known as "false set," which interferes greatly with handling operations such as transport, casting and finishing of concrete.

The problem of false set can be more severe with high $C_3A$ portland cements which need higher proportions of gypsum for set retardation. This problem can be solved or ameliorated by using anhydrite (CS), either natural (if available) or synthetic as made by burning gypsum at a temperature between 600° and 1200°C. Anhydrite is much less soluble than plaster of Paris and it is less soluble than gypsum. Natural anhydrite is less soluble than synthetic anhydrite. By substituting all or part of the gypsum component of portland cement with anhydrite the problem of false set is solved or ameliorated. However, natural anhydrite is not always available at an acceptable price and synthetic anhydrite is expensive.

The problem of false set can, of course, be solved by grinding portland cement clinker and gypsum separately and then mixing them, but it is cheaper to intergrind the two materials. Also a more uniform blend is achieved by intergrinding than by blending the separately ground materials. Care may be taken to cool the portland cement clinker and the intergrinding of cool clinker and the gypsum may be done carefully so as to avoid exposure of gypsum to excessive heat, but such expedients are troublesome.

It is an object of the present invention to provide improvements in the manufacture of portland cement.

It is a particular object of the invention to provide improvements in the production of portland cement with respect to the problem of false set due to the presence of plaster of Paris.

Other objects of the invention will be apparent from the ensuing description and the appended claims.

In accordance with the present invention, an expansive clinker of the calcium sulfoaluminate type is provided which has a substantial excess of calcium sulfate (CS) above that required to form ettringite, and this clinker is included in portland cement, preferably by intergrinding the expansive clinker and portland cement clinker. The composition and amount of such expansive clinker are such as to contribute an expansive property to the cement and also to supply all or a substantial portion of the calcium sulfate needed to prevent quick setting of cement.

As is well known [see Klein U.S. Pat. No. 3,155,526, also Halstead and Moore, J. Applied Chemistry, vol. 12, pages 413–415 (1962)] when limestone, alumina (e.g., bauxite) and gypsum are mixed (e.g., by intergrinding) in proper proportions and are heated, as in a kiln, to incipient fusion, there is formed the ternary compound $C_4A_3S$, also represented as $(CaO)_3(Al_2O_3)_3 \cdot CaSO_4$. This ternary compound in the presence of sufficient calcium sulfate and lime, will hydrate to the high sulfate or ettringite, thus, 2. $(CaO)_3(Al_2O_3)_3 \cdot CaSO_4 + 8\ CaSO_4 + 6\ CaO \rightarrow (CaO)_6\ Al_2O_3\ (SO_3)_3 \cdot 32\ H_2O$ It is the formation of this expansive high sulfate under conditions of restraint which offsets the detrimental influence of stresses caused by drying shrinkage of concrete. The amount of ternary, $C_4A_3S$, and concomitant or added materials may be sufficient only to compensate in part for normal drying shrinkage, or it may compensate entirely for such shrinkage or bring about a net expansion, and therefore stressing of steel reinforcement to place restrained concrete in compression. Both purposes (elimination or reduction of shrinkage and stressing of steel reinforcement) are useful, because shrinkage causes cracking, and stressing of steel reinforcement places concrete in compression, which eliminates shrinkage cracks and strengthens the concrete.

In accordance with the present invention, advantage is taken of these phenomena but also, because the excess [above that required for reaction (2)] of CS in the expansive clinker, the clinker supplies part or all of the retarding sulfate requirement of portland cement and, in so doing, other advantages are provided.

Thus, the calcium sulfate component of the expansive clinker is in the form of hard burned anhydrite (CS), therefore it does not give rise to false set. Moreover, the expansive clinker may be interground with hot portland cement clinker without the danger of forming plaster of Paris. The expansive clinker is separately ground or, preferably, it is interground with portland cement clinker and in either case it is ground to a fineness (e.g., 70 percent or more is less than 44µ or 325 mesh) equal to that of portland cement. An expansive clinker presently proposed by others is limited in size to at least 70 percent greater in size than 325 mesh, which requires separate grinding of the clinker. The expansive clinker of the present invention imposes no such limitations; it can be interground with portland cement clinker to a fineness in which 70 percent or more is less than 325 mesh. The reactivity of the finely ground expansive clinker of the present invention is controllable by other means. For example, the lime content of my expansive clinker may be as low as zero. This results in a harder and less reactive clinker. A large amount of lime in the expansive clinker replaces other useful ingredients of portland cement such as $C_3S$ and/or $C_2S$, also $C_4A_3S$ and CS; the function of lime in the setting of portland cement is adequately performed by lime resulting from hydration of portland cement when water is added. Also the presence of high free lime makes the expansive clinker softer.

By "lime" as used herein in this particular context is meant CaO as determined by the method of ASTM C114–58. It is not intended to exclude such lime from the expansive clinker of the present invention, which may be present in small amounts but very low lime content is preferred.

Another advantage of the high CS, low C clinkers of the present invention is that they can be made from a wider variety of cheap commercial materials, i.e., less pure materials such as siliceous limestone and bauxite containing relatively large proportions of ferric oxide. In fact, the presence of some silica (S) and ferric oxide (F) are considered advantageous. Thus ferric oxide acts as a flux and facilitates sintering and formation of the clinker. Both silica and ferric oxide result in a less reactive clinker which therefore can be ground to the same fineness as portland cement without the danger of inducing fast reactions. The possibility of using less pure sources of C, A and S to form the clinker makes the process more economical, especially in areas where plentiful supplies of pure sources are unavailable.

In producing the clinker of the present invention, conventional procedures, for example those of Klein U.S. Pat. No. 3,155,526 are used but with the proviso that the proportions of C, A and S source materials are such as to produce a clinker having a substantial excess of CS above that required for production of ettringite according to Equation (2), and that the burning be done at a temperature low enough to avoid excessive decomposition of CS, thus 3. $CaSO_4 \rightarrow CaO + SO_3$ This decomposition reaction will cause loss of volatile $SO_3$. As is shown by Halstead and Moore, *op. cit.* the partial pressure (which is a measure of decomposition) of $SO_3$ in the case of the ternary compound $C_4A_3S$ is very low but the excess of CS in my clinker is more prone to decompose according to the Equation (3). Therefore sintering or burning temperatures much in excess of about 1300°C are to be avoided.

Recommended proportions (percent weight basis) of C, A and S are as follows, it being understood that suitable materials are used to provide the oxides, such as limestone to provide C, bauxite to provide A and gypsum to provide C and S.

Table 1

| (percentages by Weight Based on Mixture) | |
|---|---|
| C | 35 to 50 |
| A | 8 to 10 |
| S | 40 to 50 |

The materials are separately ground or, preferably, are interground, either wet or dry, to a suitable fineness, for example, less than 20 percent residue in a 200 mesh sieve. If they are separately ground, they are then intimately mixed together. They are then fired to a temperature, preferably about 1100° to 1300° C, in any suitable type of equipment such as a gas fired kiln or an electric furnace and the heating is continued for a time sufficient to produce the ternary compound $C_4A_3S$ but insufficient to decompose much, if any, of the CS. There results a clinker which can then be ground to a suitable fineness, for example 70 percent or more through 325 mesh. Such grinding can be done separately from the grinding of portland cement clinker but preferably it is done by intergrinding with portland cement clinker.

The proportions of expansive material and portland cement, whether by intergrinding or by separate grinding and subsequent blending, may vary from (a) just enough expansive clinker to impart a small but substantial degree of expansion to concrete (partially offsetting drying shrinkage) and to supply a small but substantial portion of the CS needed to inhibit quick set to (b) an amount sufficient to compensate completely for shrinkage of concrete or to result in a substantial expansion and also to supply all of the CS needed to prevent quick set. If the portland cement is low in $C_3A$ relatively less expansive material need be added; on the other hand if the $C_3A$ content is high then a greater amount of CS must be supplied all or most of which may come from the expansive clinker. Accordingly in high $C_3A$ portland cements a greater quantity of expansive clinker may be employed, or a small proportion of gypsum may be interground with the expansive clinker and portland cement. The following tables are illustrative:

Table 2

| Composition of expansive clinker of the invention. | |
|---|---|
| 10 to 25% | $C_4A_3S$ |
| 50 to 80% | CS |

Table 3

Composition of portland cement of the invention

| | | |
|---|---|---|
| (a) | Low $C_3A$ portland cement, | 5 to 10% of expansive clinker |
| | e.g., less than 5% $C_3A$ | 90 to 95% portland cement |
| (b) | High $C_3A$ portland cement, | 10 to 15% of expansive clinker |
| | e.g., more than 10% $C_3A$ | 85 to 90% portland cement |

The following specific Example will further illustrate the practice and advantages of the invention:

EXAMPLE 1

Typical (i.e., readily available) raw materials are taken as follows:

Table 4.

Chemical composition of typical commercial raw material

| | $SiO_2$ | $Al_2O_3$ | $Fe_2O_3$ | CaO | MgO | $SO_3$ |
|---|---|---|---|---|---|---|
| | | | (% on ignited basis) | | | |
| Limestone | 8.20 | 1.30 | 0.70 | 88.60 | 1.20 | — |
| Bauxite | 6.00 | 85.30 | 8.50 | 0.20 | — | — |
| Gypsum | 1.40 | — | — | 42.00 | — | 56.60 |

These materials are mixed in the following proportions and interground to a fineness of 85 percent passing a 200 mesh sieve.

Table 5.

Typical mix proportioning for making the expansive clinker

| | $SiO_2$ | $Al_2O_3$ | $Fe_2O_3$ | CaO | MgO | $SO_3$ |
|---|---|---|---|---|---|---|
| | | | (on ignited basis) | | | |
| 10% limestone | 0.82 | 0.13 | 0.07 | 8.86 | 0.12 | — |
| 10.5% bauxite | 0.63 | 8.96 | 0.89 | 0.02 | — | — |
| 79.5% gypsum | 1.20 | — | — | 33.40 | — | 45.00 |

The mixture when heated in a kiln at a temperature of 1300°C for 1 hour will produce a clinker having the following theoretical analysis (Table 6) and composition (Table 7).

Table 6.

Clinker Analysis. Percent by weight

| $SiO_2$ | $Al_2O_3$ | $Fe_2O_3$ | CaO | MgO | $SO_3$ |
|---|---|---|---|---|---|
| 2.25 | 9.09 | 0.96 | 42.28 | 0.12 | 45.00 |

Table 7.

Compound composition. Percent by weight

| | | |
|---|---|---|
| $C_2S$ | = | 7.3% |
| $C_4AF$ | = | 2.9% |
| $C_4A_3S$ | = | 16.9% |
| $CS$ | = | 72.7% |

Typically, the resulting clinker when interground with a portland cement clinker containing 10% $C_3A$ in the proportions of 10 percent of expansive clinker and 90 percent of portland cement clinker, will provide about 7.3 percent of CS which satisfies the sulfate requirement with regards to prevention of quick set, and thus the need to add gypsum or anhydrite to the cement clinker is dispensed with. It also provides enough calcium sulfate to form ettringite (from $C_4A_3S$ and $C_3A$) for shrinkage compensation purposes. It will therefore be apparent that novel and useful improvements in portland cement have been provided.

I claim:

1. A calcium sulfoaluminate clinker of the $(CaO)_4.(Al_2O_3)_3SO_3$ type containing in the clinker, and in particles resulting from grinding the clinker, an amount of $CaSO_4$ at least about 50 percent and substantially in excess of that required for the production of ettringite on hydration of $(CaO)_4(Al_2O_3)_3SO_3$.

2. As a composition of matter, a homogeneous mixture of $(CaO)_4(Al_2O_3)_3SO_3$ and $CaSO_4$, the latter exceeding about 50 percent of the weight of the composition.

3. The composition of claim 2 containing less than about 50 percent of total lime.

4. The composition of claim 1 ground to a fineness such that at least 70 percent is smaller than 325 mesh.

5. A process of producing an expansive $(CaO)_4(Al_2O_3)_3SO_3$ clinker which comprises forming a mixture of materials which, on heating, provide the oxides CaO, $Al_2O_3$ and $SO_3$ and are capable of forming $(CaO)_4(Al_2O_3)_3SO_3$, the proportions of such materials being selected to produce an excess of $CaSO_4$ in the resulting clinker above that required for the reaction $(CaO)_4(Al_2O_3)_3SO_3 + 8CaSO_4 + 6CaO + 32H_2O \rightarrow (CaO)_6Al_2O_3SO_3 . 32H_2O$ and amounting to at least 50% $CaSO_4$, such excess being substantial and enough to provide, when the resulting clinker is added to portland cement, at least a substantial proportion of the $CaSO_4$ requirement of portland cement, said process comprising heating such mixture of materials sufficiently to form $(CaO)_4(Al_2O_3)_3SO_3$ and $CaSO_4$.

6. A process for producing a portland cement composition consisting mainly of portland cement which comprises mixing with the portland cement an expansive material consisting mainly of $(CaO)_4(Al_2O_3)_3SO_3$ and $CaSO_4$, the $CaSO_4$ component of such expansive material being present in an amount not less than about 65 percent and in excess of the $CaSO_4$ required for the reaction:

$$(CaO)_4(Al_2O_3)_3SO_2 + 8CaSO_4 + 6CaO + 32 H_2O \rightarrow$$
$$(CaO)_6 Al_2O_3(SO_3)_3 \cdot 32H_2O$$

7. The process of claim 6 wherein the portland cement composition is formed by intergrinding portland cement clinker with the expansive material in clinker form.

8. A cement composition containing portland cement as its principal ingredient and also containing an expansive component in the form of $(CaO)_4(Al_2O_3)_3SO_3$ plus $CaSO_4$ in quantity not less than about 65 percent and sufficient to at least partially compensate for drying shrinkage of concrete made with the cement, the $CaSO_4$ being also in excess of that required to react with the $(CaO)_4(Al_2O_3)_3SO_3$ to form ettringite.

* * * * *